June 20, 1961     H. R. D. CARLSON     2,989,103
NUTCRACKER
Filed Aug. 24, 1959
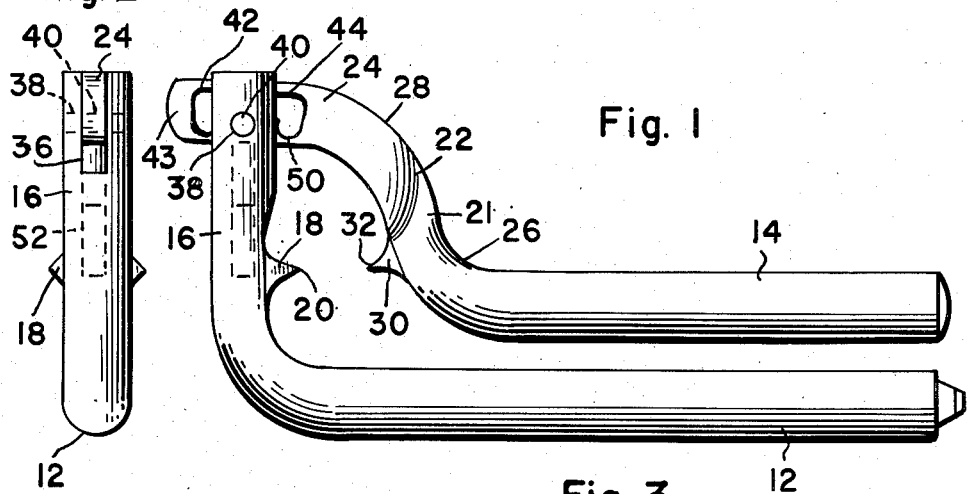
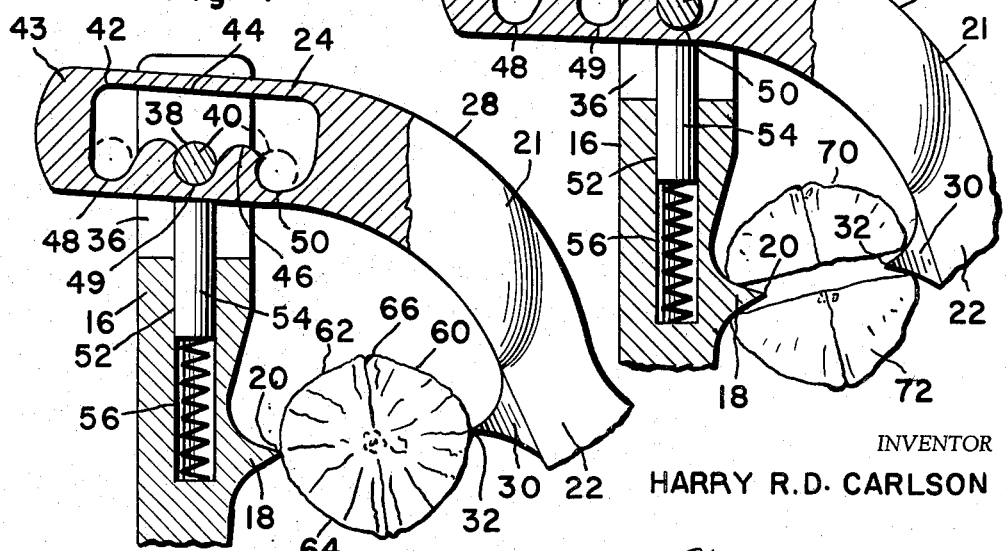
INVENTOR
HARRY R.D. CARLSON
BY *Gilbert E. Moody*
ATTORNEY

United States Patent Office 2,989,103
Patented June 20, 1961

2,989,103
NUTCRACKER
Harry R. D. Carlson, 1109 S. Johnson Road, Turlock, Calif.
Filed Aug. 24, 1959, Ser. No. 835,663
3 Claims. (Cl. 146—13)

This invention relates to a device for cracking edible nuts, the general object of the invention being to provide a new and improved implement by means of which the shells of pecans, walnuts, Brazil nuts, and other nuts of similar inflexibility are effectively split in an easy and convenient manner leaving the kernels or meat portions substantially intact.

Another object of the invention is to provide a simple, cheap, and attractive nutcracker which will be durable in construction and reliable in operation.

A further object of the invention is to provide a new and improved device for splitting the shells of nuts which is quickly adjustable to operate on nuts of various sizes.

Another object of the invention is to provide a new and improved nutcracker having a pair of adjustably pivoted handle levers, each of which is formed with a section constituting a jaw having a V-shaped nut splitting blade arranged to split a nut shell into two parts when the handle levers are squeezed together.

A still further object of the invention is to provide a new and improved implement for splitting the shell of a nut in order to separate the nut kernal in halves from the shell without crushing or smashing the nut kernel.

Another object of the invention is to provide a new and improved implement for splitting the shells of nuts, which includes actuating means having a pair of substantially complementary blades for shell splitting means or shell spreading means.

Still another object of the invention is to provide a new and improved nutcracker of the above character which is adapted for use in splitting the shells of nuts in such a manner that the meat therein may be removed in unbroken state.

The invention also comprises certain new and useful improvements in the construction, arrangement and combination of the several parts of which it is composed, as will be hereinafter more fully described and claimed.

In the accompanying drawing:

FIG. 1 is a side elevation of a nutcracker constructed according to the preferred embodiment of the present invention;

FIG. 2 is an end elevation of the structure shown in FIG. 1;

FIG. 3 is a top plan view of the nutcracker;

FIG. 4 is an enlarged section taken along the line 4—4 of FIG. 3, showing the handle levers in one adjusted position, and the manner in which an English walnut is positioned between the nut-splitting blades thereof; and FIG. 5 is a sectional view similar to FIG. 4 showing the handle levers in another adjusted position, and the manner in which a nut is split in two by the nut-splitting blades.

Referring to the drawing, the new and improved nutcracker of the present invention comprises a pair of handle levers 12 and 14, both of which are preferably formed of substantially round stock of suitable diameter and length to provide elongated hand grip body portions, as well as other structural parts to be hereinafter referred to.

At one end, the body of the handle lever 12 is bent to provide an upwardly projecting arm 16 which is preferably arranged substantially at right angles with the main body whereby said handle lever is substantially L-shaped in form. The arm 16 constitutes one jaw of the nutcracker as will be hereinafter more fully described.

A V-shaped blade 18 is formed on one side of the arm 16 at a suitable distance below the upper end thereof. This blade 18 is of greater breadth than the thickness of the arm 16, so that a relatively broad edge 20 is provided for splitting the shells of nuts engaged therewith in the manner to be hereinafter more fully described.

The handle lever 14 normally overlies the hand grip portion of the handle lever 12 and at one end is bent to provide a goose-neck shaped arm 21 including an upwardly projecting portion 22 and a portion 24 which projects outwardly from the portion 22.

The upwardly projecting portion 22 constitutes the second jaw of the nutcracker, and is preferably connected to the main body of the handle lever 14 by an arcuate portion 26, and connected to the outwardly projecting portion 24 by an arcuate portion 28, said arcuate portions 26 and 28 being of suitable curvature, as shown in FIG. 1.

Outwardly from the arcuate portion 28, the round body of the handle lever 14 is modified in shape, so that the portion 24 of the arm 21 is in the form of a flat-sided bar having a thickness considerably less than the diameter of the main body of the handle lever 14.

A V-shaped blade 30 is formed on one side of the jaw portion 22 of the arm 21. The blade 30 is arranged in opposed relationship with the blade 18 of the arm 16 and has a greater breadth than the thickness of the portion 22 of the arm 21 so that a relatively broad edge 32 is provided for splitting nuts engaged therewith in the manner to be hereinafter more fully described.

A vertical slot 36 is formed in the arm 16 of the handle lever 12 and extends downwardly a suitable distance from the upper end thereof.

The outwardly projecting portion 24 of the arm 21 of the handle lever 14 is adapted to be mounted in the slot 36, therefore, said slot should have a width of suitable dimensions to permit free movements of the two handle levers 12 and 14 during operation of the device.

Mounted in a pair of aligned holes 38 formed in the upper slotted portion of the arm 16, is a pin 40 which is arranged tranversely of the slot 36 in the manner shown in FIGS. 2 and 3.

The arm 16 supports the outer goose-neck shaped arm 21 of the handle lever 14 which is arranged within the slot 36.

An elongated opening 42 is formed in the portion 24 of the arm 21 adjacent to the outer end 43 thereof. This opening 42 extends lengthwise of the portion 24 for a suitable distance and has an upper longitudinal edge 44 and a bottom 46 arranged in suitable spaced relationship with respect to the upper edge 44.

Spaced notches 48, 49 and 50 are formed in the bottom of the opening 42 in the manner shown best in FIGS. 4 and 5.

The pin 40 is arranged to be mounted in one of the notches 48, 49 and 50 and thereby provide a pivotal connection for the two handle levers 12 and 14, said notches having a contour adapted to receive said pin and prevent accidental dislodgement thereof under normal operating conditions.

A cylindrical chamber or cavity 52 is formed vertically within the arm 16 and arranged beneath the slot 36.

A plunger 54 is slidably mounted in the chamber 52 and is urged upwardly against the bottom edge of the portion 24 of the handle lever 14 by a spiral spring 56 having one end bearing against the bottom of the plunger 54 and its other end bearing against the bottom of the chamber 52.

The construction and arrangement of the parts is such that the pivot pin 40 is normally retained in position in the notch 49 through the action of the spring-pressed plunger 54. However, when a downward force is applied to the outer end 43 of the arm 21, the portion 24 thereof will be moved downwardly in the slot 36 a distance sufficient to remove the pivot pin 40 from the notch 49 in which it was seated and thereby dispose said pivot pin in the elongated opening 42 above the notches. When the pivot pin 40 is thus disposed in the opening 42, the handle lever 14 can be shifted lengthwise with respect to the handle lever 12, either toward the right or toward the left to bring either the notch 48 or the notch 50 in alignment with the pivot pin and thereby set the pivotal connection of the handle lever 14 with the arm 16 of the handle lever 12 at another desired position. When the relative position of the lever 14 with respect to the lever 12 has thus been adjusted, the downward force against the outer end 43 of the arm 21 is released, whereupon the spring-pressed plunger 54 acts on the portion 24 of said lever arm 21 to seat the pivot pin 40 in the notch. In this manner the space separating the two jaws 16 and 22 of the device can be varied to accommodate nuts of different sizes.

When it is desired to crack nuts of relatively large size, the handle lever 14 should be arranged with the pivot pin 40 mounted in the notch 48, and when relatively small nuts are to be cracked or split, the handle lever 14 should be arranged with the pivot pin 40 mounted in the notch 50, FIG. 5. Nuts of average size, such as English walnuts of ordinary or small dimensions, pecans, and Brazil nuts, can readily be operated upon with the pivot pin 40 mounted in the notch 49, as shown in FIGS. 1 and 4.

The two jaws 16 and 22 maintain the two blades 20 and 30 respectively in suitable spaced relationship to provide a gap therebetween when the handle lever 14 is swung upwardly about the pivot pin 40 a predetermined distance above the handle lever 12 so as to dispose the blades 20 and 30 in suitable spaced relationship to receive an uncracked nut.

Thus, in order to clearly illustrate the manner in which the new and improved nutcracker of the present invention functions, in FIG. 4 I have shown an English walnut 60 in position between the blades 20 and 30 of the jaws 16 and 22.

Generally most nuts have a shell so formed that they can be split naturally. For instance, the shell of the walnut 60 is formed in two halves 62 and 64 which are separated by a connecting web or ridge 66.

When a nut of the type in which the shell 60 of the nut is formed with the connecting web or ridge 66 is to be cracked, the nut should be positioned in the device so that the two blades 20 and 30 will operate to fracture the nut shell 60 in a direction transverse to the web 66 of the shell, since this action results in the nut kernel within the shell being split into two sections. This is due to the fact that the kernel of the nut, or the meat thereof, lies within the shell generally transversely of the web 66.

Since the blades 20 and 30 are arranged to engage the nut shell from opposite directions, when the two handle levers 12 and 14 are squeezed together with predetermined pressure, the shell of the nut will be split without the liability of the kernel or meat of the nut being crushed or smashed as is so often found in ordinary nutcrackers.

With a Brazil nut, it has been found that the blades 20 and 30 act in a shearing manner on one side of the nut.

During operation, the action should be fairly fast to do a good job of splitting the nut shell. Also, care should be taken to place each nut between the blades 20 and 30 so that the nuts are naturally split, as has been described.

FIG. 5 illustrates the manner by which a nut is split into two sections 70 and 72 when the pivot pin 40 is mounted in the notch 50 of the handle lever 14.

It will be noted that the present invention comprises certain new and useful improvements in the construction, arrangement and combination of the several parts of which it is composed so that the shells of nuts can be split in such a manner that the meat therein may be removed in an unbroken state. Also, the invention provides a new and improved implement having adjustable means for splitting the shells of nuts of various sizes, without crushing or smashing the nut kernels.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiment is therefore, to be considered in all respects as illustrative and not restrictive, the scope of the invention being indicated by the appended claims rather than by the foregoing description, and all changes which come within the meaning and range of equivalents of the claims are therefore intended to be embraced therein.

What is claimed is:

1. A nutcracker comprising a pair of levers having operating handle portions, one said lever having a rigid arm integral therewith projecting upwardly from the end thereof opposite said handle portion whereby said lever is substantially L-shaped in form, a vertical slot formed in the upwardly extending lever arm and extending downwardly from the upper end thereof, the second lever having an integral goose-neck shaped portion projecting from its handle and having an outer arm beyond said goose-neck mounted within the vertical slot of said L-shaped lever, an opening formed in the outer arm of the second lever, said opening being arranged within the slotted portion of said L-shaped lever, a pivot pin mounted in the slotted portion of said L-shaped lever and arranged transversely thereof at a point above the bottom of said slot and extending through the opening in the outer arm of said second lever, a seat formed in the opening of the outer arm of said second lever for said pivot pin whereby one said lever is arranged in a predetermined position with respect to the other said lever, a cavity formed within the upwardly extending arm of the first lever and extending downwardly from the bottom of said slot, a plunger slidably mounted within said cavity, a spring within said cavity acting on said plunger for urging the plunger upwardly against said second lever arm whereby said pin is maintained against said seat, and a nut cracking element on each lever between the operating handle portion thereof and said pivot pin, the nut cracking element of one lever being arranged with respect to the nut cracking element of the other lever to engage the opposite sides of a nut positioned between said levers to split the nut into two parts when the handles of said levers are squeezed together.

2. A nutcracker comprising a pair of levers having operating handle portions, one said lever having a rigid arm integral therewith projecting upwardly from the end thereof opposite said handle portion whereby said lever is substantially L-shaped in form, a vertical slot formed in the upwardly extending lever arm and extending downwardly from the upper end thereof, the second lever having an integral goose-neck shaped portion projecting from its handle and having an outer arm beyond said goose-neck mounted within the vertical slot of said L-shaped lever, an opening formed in the outer arm of the second lever adjacent the outer end portion thereof, said opening being arranged within the slotted portion of said L-shaped lever, a pivot pin mounted in the slotted portion of said L-shaped lever and arranged above the bottom of said slot and extending through the opening in the outer arm of said second lever, a seat formed in the opening of the outer arm of said second lever for said pivot pin whereby one said lever is arranged in a predetermined position with respect to the other said lever, a cavity formed within the upwardly extending arm of the first lever and extending downwardly from the bottom of said slot, a plunger slidably mounted within said cavity, a spring within said cavity acting on said plunger for urging the plunger upwardly against said second lever arm whereby said pin is maintained against said seat and said levers are movable toward and away from each other, and a single nut cracking element on each said lever between the operating handle portion thereof and said pivot pin, the nut cracking element of one lever being arranged with respect to the nut cracking element of the other lever to engage the opposite sides of a nut positioned between said levers to split the nut into two parts when the handle portions of said levers are squeezed together.

3. A nutcracker comprising a pair of levers having operating handle portions, one said lever having a rigid arm integral therewith projecting upwardly from the end thereof opposite said handle portion whereby said lever is substantially L-shaped in form, a vertical slot formed in the upwardly extending lever arm and extending downwardly from the upper end thereof, the second lever having an integral goose-neck portion projecting from its handle and having an outer arm beyond said goose-neck mounted within the slot of said L-shaped lever, an opening formed in the outer arm of the second lever adjacent the outer end portion thereof, said opening being arranged within the slotted portion of said L-shaped lever, a pivot pin mounted in the slotted portion of said L-shaped lever and arranged transversely thereof at a point above the bottom of said slot and extending through the opening in the outer arm of said second lever, a seat formed in the opening of the outer arm of said second lever for said pivot pin whereby one said lever is arranged in a predetermined position with respect to the other said lever, a cavity formed within the upwardly extending arm of the first lever and extending downwardly from the bottom of said slot, a plunger slidably mounted within said cavity, means within said cavity acting on said plunger for urging the plunger upwardly against said second lever arm whereby said pin is maintained against said seat and said levers are movable toward and away from each other, a nut cracking element on said L-shaped lever, and a nut cracking element on the goose-neck portion of said second lever, the nut cracking element of the L-shaped lever being arranged with respect to the nut cracking element of the second lever to engage the opposite sides of a nut positioned between said levers to split the nut into two parts when the handle portions of said levers are squeezed together.

References Cited in the file of this patent

UNITED STATES PATENTS

| | | |
|---|---|---|
| 1,268,484 | Olasz | June 4, 1918 |
| 2,541,424 | Koch | Feb. 13, 1951 |
| 2,758,622 | Greenblatt | Aug. 14, 1956 |

FOREIGN PATENTS

| | | |
|---|---|---|
| 582,559 | Germany | Aug. 17, 1933 |